United States Patent
Tomiyasu et al.

(10) Patent No.: US 12,025,843 B2
(45) Date of Patent: Jul. 2, 2024

(54) OPTICAL PROCESSING STRUCTURE OF OPTICAL FIBER

(71) Applicant: FURUKAWA ELECTRIC CO., LTD., Tokyo (JP)

(72) Inventors: Takahiro Tomiyasu, Tokyo (JP); Hirotatsu Ishii, Tokyo (JP); Yoshihiro Emori, Tokyo (JP); Kenichi Suyama, Tokyo (JP); Kouji Mochiduki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 91 days.

(21) Appl. No.: 17/479,269

(22) Filed: Sep. 20, 2021

(65) Prior Publication Data
US 2022/0003950 A1 Jan. 6, 2022

Related U.S. Application Data

(63) Continuation of application No. PCT/JP2020/013432, filed on Mar. 25, 2020.

(30) Foreign Application Priority Data

Mar. 29, 2019 (JP) .................................. 2019-065273

(51) Int. Cl.
*G02B 6/293* (2006.01)
*G02B 6/02* (2006.01)
*G02B 6/44* (2006.01)

(52) U.S. Cl.
CPC ......... *G02B 6/443* (2013.01); *G02B 6/02104* (2013.01); *G02B 6/29331* (2013.01)

(58) Field of Classification Search
CPC ............ G02B 6/021; G02B 6/02104; G02B 6/02342; G02B 6/29331
See application file for complete search history.

(56) References Cited

U.S. PATENT DOCUMENTS

| 4,637,686 A * | 1/1987 | Iwamoto | ............... G02B 6/443 |
| | | | 362/582 |
| 2006/0062518 A1* | 3/2006 | Galstian | ............... B82Y 10/00 |
| | | | 385/27 |

(Continued)

FOREIGN PATENT DOCUMENTS

| CN | 104466637 A | 3/2015 |
| CN | 106772787 A | 5/2017 |

(Continued)

OTHER PUBLICATIONS

Extended European Search Report issued Jun. 29, 2022, in Patent Application No. 20782315.4, 24 pages.

(Continued)

*Primary Examiner* — Charlie Y Peng
(74) *Attorney, Agent, or Firm* — Oblon, McClelland, Maier & Neustadt, L.L.P.

(57) ABSTRACT

An optical processing structure of an optical fiber, includes: an optical fiber that includes a core, a cladding, and a coating, the coating being partially removed; and a thermally conductive protective material made of a silicone-based thermally conductive compound and provided around the cladding in a coating removed region of the optical fiber. Further, the thermally conductive protective material contains a filler having a refractive index higher than a refractive index of the cladding, and the filler is present in a region where evanescent light seeping out of the cladding is present when cladding mode light propagating in the cladding is totally reflected.

8 Claims, 6 Drawing Sheets

(56) References Cited

U.S. PATENT DOCUMENTS

| | | | |
|---|---|---|---|
| 2014/0270667 A1 | 9/2014 | Holland et al. | |
| 2015/0260911 A1* | 9/2015 | Ilyashenko | H01S 3/302 372/6 |
| 2016/0343918 A1 | 11/2016 | Yamada et al. | |
| 2018/0375279 A1 | 12/2018 | Kajiwara et al. | |
| 2019/0229489 A1 | 7/2019 | Matsumoto | |
| 2020/0103593 A1 | 4/2020 | Kuniyasu et al. | |
| 2021/0103096 A1 | 4/2021 | Matsumoto | |

FOREIGN PATENT DOCUMENTS

| | | | |
|---|---|---|---|
| CN | 108603983 A | | 9/2018 |
| JP | 2010-239037 A | | 10/2010 |
| JP | 5378861 B2 | * | 12/2013 |
| JP | 2014-193806 A | | 10/2014 |
| JP | 2016-219613 A | | 12/2016 |
| JP | 2018-81127 A | | 5/2018 |
| JP | 2018-165813 A | | 10/2018 |
| WO | WO 2013/096364 A1 | | 6/2013 |
| WO | WO 2017/135465 A1 | | 8/2017 |
| WO | WO 2018/066148 A1 | | 4/2018 |
| WO | WO 2018/199304 A1 | | 11/2018 |

OTHER PUBLICATIONS

European Office Action issued Jan. 24, 2023 in European Patent Application No. 20782315.4, 6 pages.

Parker-Chomerics, "Thermal Interface Materials For Electronics Cooling Products & Custom Solutions Catalog," Retrieved from the Internet [URL: http://www.unitedseal.com/wp-content/uploads/2013/05/Thermal-Interface-Materials-Spec-Resources.pdf], XP093014801, 2013, 67 pages.

Combined Chinese Office Action and Search Report issued Nov. 3, 2022 in Chinese Patent Application No. 202080018002.7 (with unedited computer generated English Translation of Office Action only), 21 pages.

International Search Report issued Jun. 16, 2020 in PCT/JP2020/013432, filed on Mar. 25, 2020, 2 pages.

Chinese Office Action issued on Aug. 23, 2023 in Chinese Patent Application No. 202080018002.7 (with unedited computer-generated English translation), 24 pages.

Notice of Reasons for Refusal issued Jul. 4, 2023 in Japanese Patent Application No. 2021-511880 (with English machine translation), 15 pages.

Chinese Office Action issued Apr. 8, 2023 in Chinese Patent Application No. 202080018002.7 (with unedited computer-generated English Translation), 18 pages.

* cited by examiner

OPTICAL PROCESSING STRUCTURE OF OPTICAL FIBER

CROSS-REFERENCE TO RELATED APPLICATION(S)

This application is a continuation of International Application No. PCT/JP2020/013432, filed on Mar. 25, 2020 which claims the benefit of priority of the prior Japanese Patent Application No. 2019-065273, filed on Mar. 29, 2019, the entire contents of which are incorporated herein by reference.

BACKGROUND

The present disclosure relates to an optical processing structure of an optical fiber.

BACKGROUND

For example, an optical processing structure (cladding mode stripper) has been known, which is applied in the field of fiber lasers or other fields to remove cladding mode light. For example, International Publication No. 2013/096364 discloses an optical processing structure in which a host material with a refractive index lower than that of a cladding is provided in a coating removed region of an optical fiber, and a diffuser is added to the host material to scatter and remove cladding mode light, thereby uniformly leak-scattering unwanted cladding mode light while suppressing local heat generation.

In addition, Japanese Laid-open Patent Publication No. 2010-239037 discloses an optical processing structure in which a thermally conductive protective material made of a silicone-based thermally conductive compound is provided at an optical output end of an optical fiber from which a coating has been partially removed, and boron nitride is added as a filler in the thermally conductive protective material.

SUMMARY

There is a need for providing an optical processing structure of an optical fiber capable of properly removing cladding mode light.

According to an embodiment, an optical processing structure of an optical fiber includes: an optical fiber that includes a core, a cladding, and a coating, the coating being partially removed; and a thermally conductive protective material made of a silicone-based thermally conductive compound and provided around the cladding in a coating removed region of the optical fiber. Further, the thermally conductive protective material contains a filler having a refractive index higher than a refractive index of the cladding, and the filler is present in a region where evanescent light seeping out of the cladding is present when cladding mode light propagating in the cladding is totally reflected.

According to an embodiment, an optical processing structure of an optical fiber includes: an optical fiber that includes a core, a cladding, and a coating, the coating being partially removed; and a thermally conductive protective material made of a silicone-based thermally conductive compound and provided around the cladding in a coating removed region of the optical fiber. Further, the thermally conductive protective material is made of a substance having a refractive index higher than a refractive index of the cladding at room temperature and becomes lower as a temperature rises, and the refractive index of the thermally conductive protective material is lower than the refractive index of the cladding in a given temperature range.

According to an embodiment, an optical processing structure of an optical fiber includes an optical fiber that includes a core, a cladding, and a coating, the coating being partially removed; and a thermally conductive protective material made of a silicone-based thermally conductive compound and provided around the cladding in a coating removed region of the optical fiber. Further, the thermally conductive protective material contains a filler having a refractive index higher than a refractive index of the cladding, and the thermally conductive protective material is a combination of a thermally conductive protective material having a refractive index higher than the refractive index of the cladding at room temperature and a thermally conductive protective material having a refractive index lower than the refractive index of the cladding.

DETAILED DESCRIPTION

In the related art, the optical processing structures disclosed in International Publication No. 2013/096364 and Japanese Laid-open Patent Publication No. 2010-239037 have a problem that, if there is no filler in the region where evanescent light seeping out of a cladding is present when cladding mode light propagating in the cladding is totally reflected, the cladding mode light is not removed.

An optical processing structure of an optical fiber according to the present disclosure will now be described with reference to the drawings. Note that the present disclosure is not limited to the following embodiment. The components in the following embodiment include those that can be replaced and are easily replaced by the skilled person, or those that are substantially the same.

Figure 1:
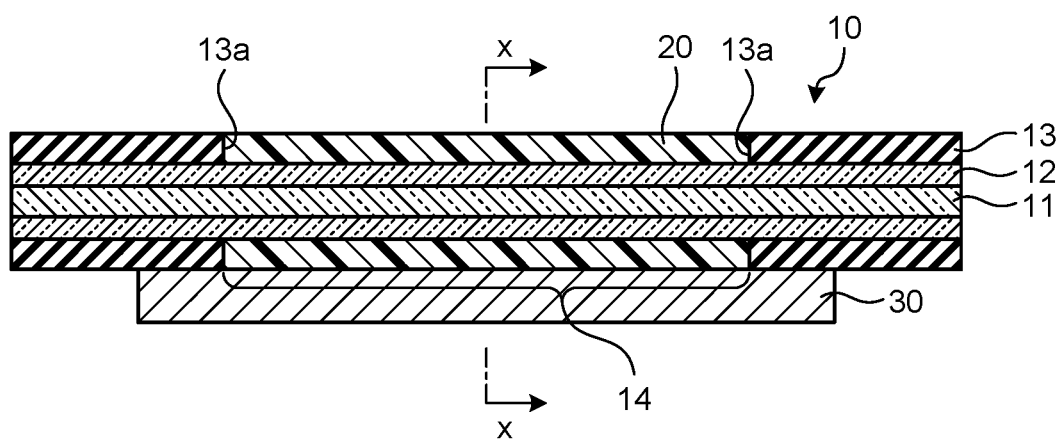
FIG. 1 is a sectional view illustrating a configuration of an optical processing structure of an optical fiber according to an embodiment of the present disclosure.
Figure 2:
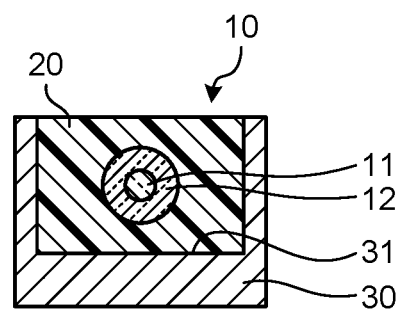
FIG. 2 is a cross-sectional view illustrating the optical processing structure of an optical fiber according to the embodiment of the present disclosure cut at the position of the X-X line in FIG. 1.

FIG. 1 is a sectional view illustrating a configuration of an optical processing structure of an optical fiber according to the embodiment of the present disclosure, and FIG. 2 is a cross-sectional view illustrating the optical processing structure of an optical fiber cut at the position of the X-X line in FIG. 1. The optical processing structure of an optical fiber has an optical fiber 10, a thermally conductive protective material 20, and a thermally conductive base material 30 on which the optical fiber 10 and the thermally conductive protective material 20 are placed.

The optical fiber 10 includes a core 11 located at the center of the optical fiber 10, a cladding 12 covering the outer circumference of the core 11, and a coating 13 covering the outer circumference of the cladding 12.

Both the core 11 and the cladding 12 are made of quartz-based glass. The core 11 is made of quartz glass doped with a dopant, such as germanium (Ge) and fluorine (F), for refractive index adjustment. The cladding 12 is made of a substance with a refractive index lower than the maximum refractive index of the core 11. The cladding 12 is made of pure quartz glass that does not contain a dopant for refractive index adjustment, for example.

The optical fiber 10 has a coating removed region 14 where the coating 13 has been partially removed. The coating removed region 14 is provided with the thermally conductive protective material 20 that functions as a cladding mode stripper to remove the cladding mode light.

The thermally conductive protective material 20 is made of a silicone-based thermally conductive compound, for example, and is provided around the cladding 12 in the coating removed region 14. The thermally conductive protective material 20 contains a filler with a refractive index higher than that of the cladding 12. This filler contains either boron nitride or aluminum nitride.

Figure 3:
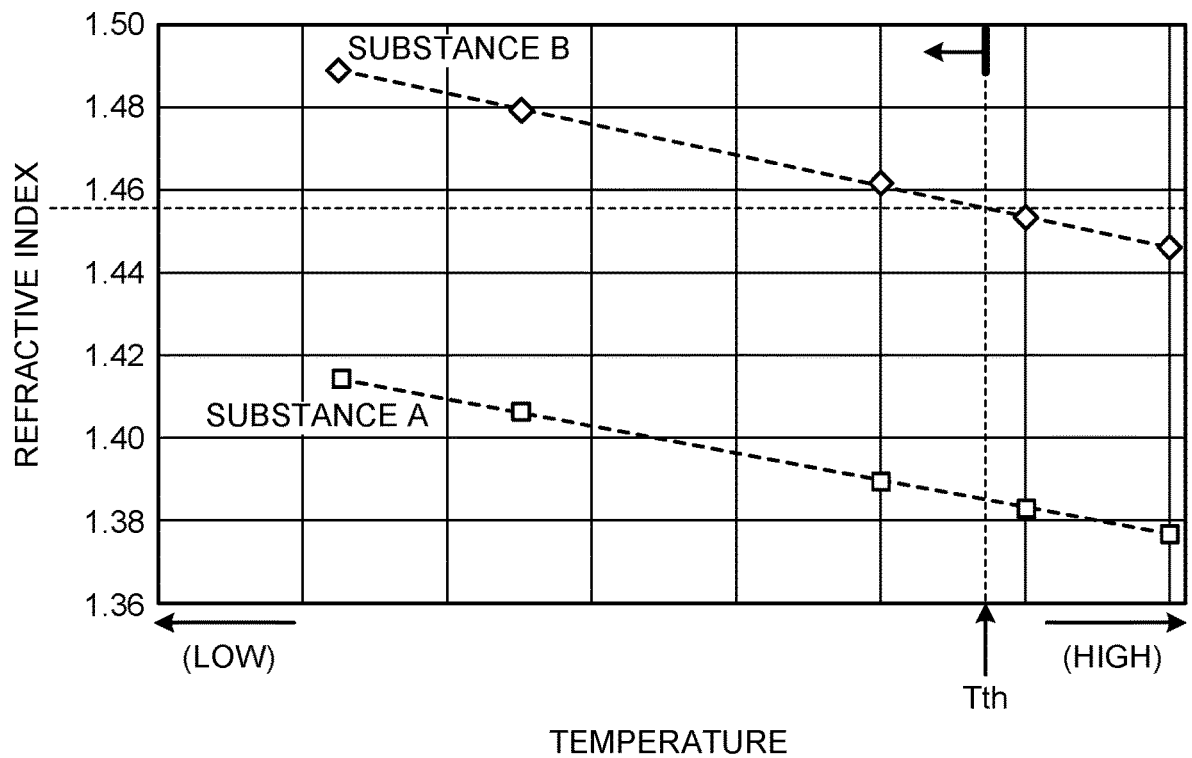
FIG. 3 is a graph representing the relationship between a temperature and a refractive index of a thermally conductive protective material.

FIG. 3 is a graph representing the relationship between a temperature and a refractive index of the thermally conductive protective material 20. In the graph, the properties of substances A and B are represented. The thermally conductive protective material 20 may be made of a substance (substance A) that has the property of decreasing the refractive index as the temperature rises. With this configuration, the cladding mode light propagating in the cladding 12 becomes less likely to propagate outside the cladding 12 as the temperature becomes higher, and thus the temperature of the thermally conductive protective material 20 and an end 13a of the coating 13 in contact with the thermally conductive protective material 20 is less likely to rise.

The thermally conductive protective material 20 may be made of a substance (substance B) that has the property of decreasing the refractive index as the temperature rises, even when the refractive index is higher than that of the cladding 12 (approximately 1.46). As a result, in the temperature range in which the refractive index of the thermally conductive protective material 20 becomes lower than that of the cladding 12, that is, in the temperature range higher than the temperature Tth (the temperature at which the refractive index of the thermally conductive protective material 20 and that of the cladding 12 become the same) in FIG. 3, the cladding mode light propagating in the cladding 12 becomes less likely to propagate outside the cladding 12. Consequently, the temperature of the thermally conductive protective material 20 and the end 13a of the coating 13 in contact with the thermally conductive protective material 20 is less likely to rise.

When the thermally conductive protective material 20 with a refractive index lower than that of the cladding 12 is used to remove the cladding light propagating in the cladding 12, the light removed from the cladding 12 is scattered by the filler in the thermally conductive protective material 20 and returns to the cladding of the optical fiber 10, and therefore, it may be impossible to completely remove the cladding light even if a light removing region is elongated. In this case, by combining the thermally conductive protective material 20 that has a refractive index higher than that of the cladding 12 at room temperature and the thermally conductive protective material 20 that has a refractive index lower than that of the cladding 12, the cladding light removed from the optical fiber 10 can be removed without returning to the optical fiber 10.

The thermally conductive base material 30 is made of aluminum with a high thermal conductivity, for example, and functions as a heat sink to dissipate the heat from the optical fiber 10 and the thermally conductive protective material 20. A groove 31 of a predetermined depth is formed in a surface of the thermally conductive base material 30. The groove 31 accommodates the optical fiber 10 and the thermally conductive protective material 20. The groove 31 accommodates the end 13a of the coating 13 that is in contact with the thermally conductive protective material 20.

The relationship between the cladding mode light propagating in the cladding 12 and the filler contained in the thermally conductive protective material 20 will now be explained with reference to FIGS. 4 to 7. In the drawings, the sectional depiction of each component is omitted. In the drawings, the filler contained in the thermally conductive protective material 20 is schematically represented by dot hatching.

Figure 4:
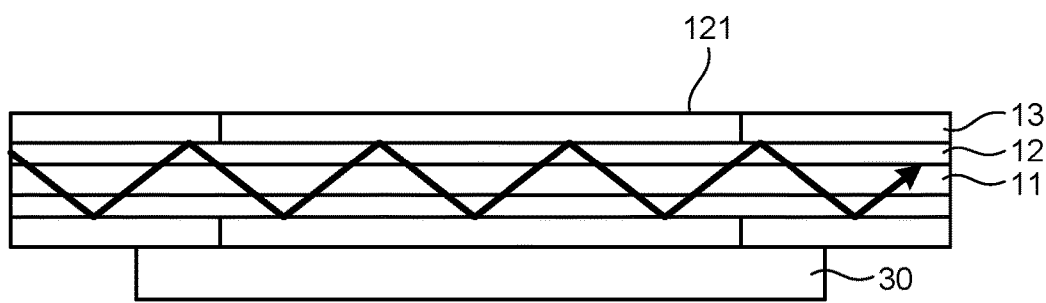
FIG. 4 is an explanatory diagram for explaining the propagation of cladding mode light when no filler is added to the thermally conductive protective material.

First, consider the case where a thermally conductive protective material 121 does not contain any filler at all as illustrated in FIG. 4. In this case, there is no filler in the region where evanescent light seeping out of the cladding 12 is present when the cladding mode light propagating in the cladding 12 is totally reflected (hereinafter referred to as the "evanescent region"). The cladding mode light therefore does not radiate outside the cladding 12, but propagates directly in the cladding 12 as represented by the arrow line in FIG. 4.

Figure 5:
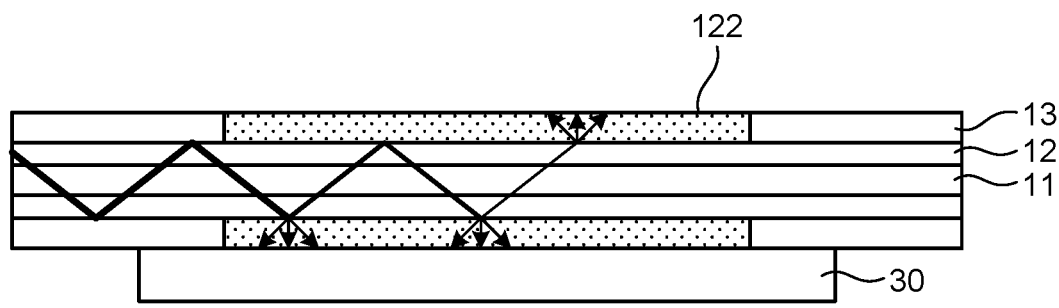
FIG. 5 is an explanatory diagram for explaining the propagation of cladding mode light when a small amount of filler is added to the thermally conductive protective material.

Next, consider the case where a thermally conductive protective material 122 contains a small amount of filler as illustrated in FIG. 5. In this case, if there is a filler in the evanescent region, the cladding mode light collides with the filler in the thermally conductive protective material 122 and scatters as represented by the arrow lines in FIG. 5, thereby being radiated to the outside of the cladding 12.

If the amount of filler contained in the thermally conductive protective material 122 is small, the amount of filler present in the evanescent region will also be small. Accordingly, in the longitudinal direction of the cladding 12, the cladding mode light propagates over a wide area, and is removed while being uniformly dispersed in the longitudinal direction. This means that the distance necessary to completely remove the cladding mode light becomes longer. When the amount of filler contained in the thermally conductive protective material 122 is small, the thermally conductive protective material 122 decreases in the overall thermal conductivity, thereby resulting in poor heat dissipation compared to the case where the amount of filler is large.

Figure 6:
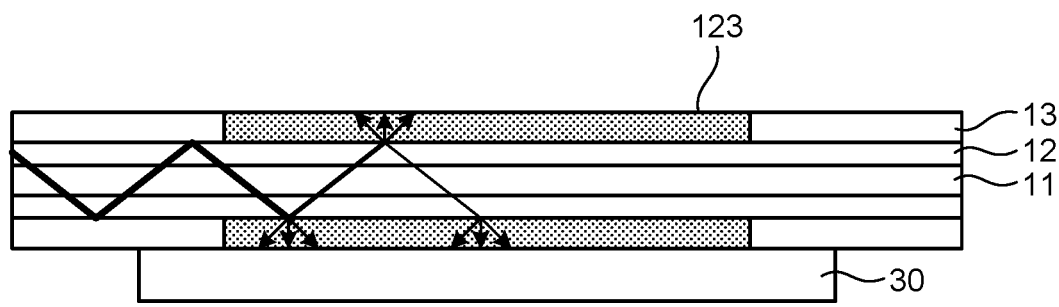
FIG. 6 is an explanatory diagram for explaining the propagation of cladding mode light when a large amount of filler is added to the thermally conductive protective material.

Next, consider the case where a thermally conductive protective material 123 contains a large amount of filler as illustrated in FIG. 6. In this case, if there is a filler in the evanescent region, the cladding mode light collides with the filler in the thermally conductive protective material 123 and scatters as represented by the arrow lines in FIG. 6, thereby being radiated to the outside of the cladding 12.

If the amount of filler contained in the thermally conductive protective material 123 is large, the amount of filler present in the evanescent region will also be large. Accordingly, in the longitudinal direction of the cladding 12, the cladding mode light propagates in a narrower area, and is removed on the nearer side than in the case where the amount of filler is small (see FIG. 5). This means that the distance necessary to completely remove the cladding mode light becomes shorter. As a result, the thermally conductive protective material 123 generates heat locally, and a resin that constitutes the thermally conductive protective material 123 may deteriorate. When the amount of filler contained in the thermally conductive protective material 123 is large, the thermally conductive protective material 123 improves in the overall thermal conductivity, thereby resulting in better heat dissipation compared to the case where the amount of filler is small.

As described above, there are the problems that: when the thermally conductive protective material 20 does not contain any filler (see FIG. 4), cladding mode light cannot be removed; when the amount of filler contained in the thermally conductive protective material 20 is small (see FIG. 5), heat dissipation is poor; and when the amount of filler contained in the thermally conductive protective material 20 is large (see FIG. 6), the resin constituting the thermally conductive protective material 20 deteriorates. Even if a small or large amount of filler is contained in the thermally conductive protective material 20, cladding mode light cannot be removed if the filler is not present in the evanescent region.

Figure 7:
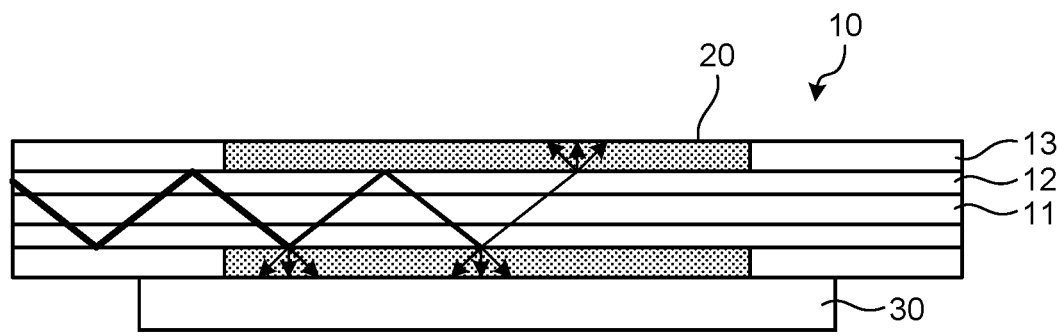
FIG. 7 is an explanatory diagram for explaining the propagation of cladding mode light when the amount of filler in an evanescent region is controlled.

Therefore, as illustrated in FIG. 7, the optical processing structure according to the present embodiment is made to achieve both removal of cladding mode light and improvement of heat dissipation, durability, and other properties, by having the filler be present in the evanescent region and controlling the amount of the filler.

In the optical processing structure according to the present embodiment, for example, based on the following equations (1) and (2), a depth Depth of the evanescent region to which the cladding mode light seeps out of the cladding 12 is calculated in advance, and the amount of filler contained in the region of the thermally conductive protective material 20 corresponding to the calculated depth Depth of the evanescent region is controlled. In other words, by adjusting the concentration of filler added to the thermally conductive protective material 20, the characteristic of removing cladding mode light is adjusted. The amount of filler to be added to the thermally conductive protective material 20 is determined experimentally in advance.

$$\text{Depth} = \frac{\lambda}{2\pi\sqrt{n_1^2 \sin^2\theta_{12} - n_2^2}} \quad (1)$$

$$\sin^2\theta_{12} = 1 - \frac{NA^2}{n_1^2} \quad (2)$$

In the above equations (1) and (2), $\lambda$ is the wavelength of the incident light, $n_1$ is the refractive index of the cladding 12, $n_2$ is the refractive index of the thermally conductive protective material 20, $\theta_{12}$ is the angle of incidence from the cladding 12 to the thermally conductive protective material 20, and NA is the numerical aperture of the optical fiber 10.

Figure 8:
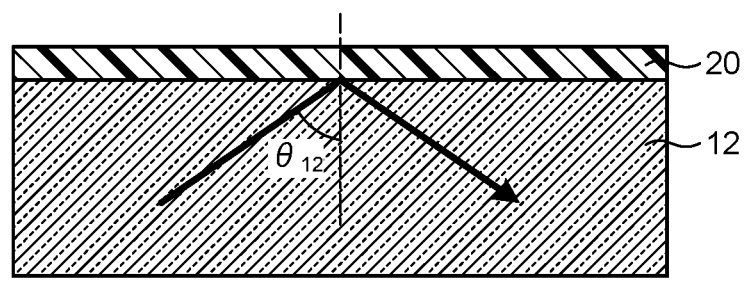
FIG. 8 is a diagram for explaining an angle of incidence from the cladding to the thermally conductive protective material.
Figure 9:
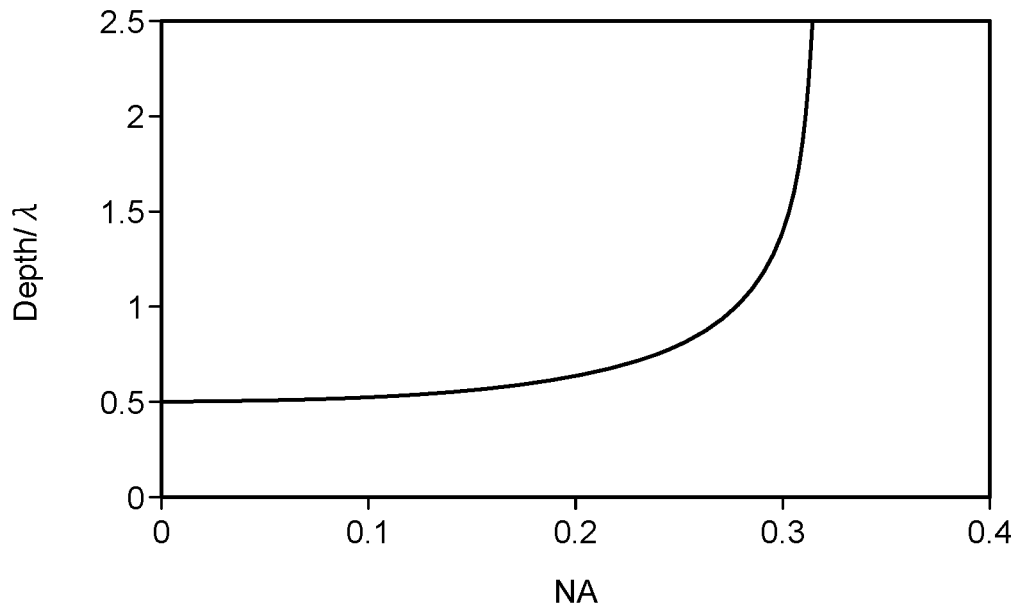
FIG. 9 is a graph representing the relationship between a numerical aperture NA of an optical fiber and "Depth/A"

FIG. 8 is a diagram schematically illustrating the angle of incidence $\theta_{12}$ from the cladding 12 to the thermally conductive protective material 20, and FIG. 9 is a graph representing the relationship between the numerical aperture NA of the optical fiber 10 and "Depth/$\lambda$". In FIG. 9, "Depth/$\lambda$" is calculated using the above equations (1) and (2) with "$n_1$=1.45" and "$n_2$=1.414".

As for the method for controlling the amount of filler in the evanescent region in the optical processing structure according to the present embodiment, as described above, the amount of filler in the evanescent region may be controlled by adjusting the amount of filler contained in the thermally conductive protective material 20 to an appropriate amount, or by adding an additive to the evanescent region to prevent the filler from being present.

In the latter case, after a predetermined amount of filler is added to the thermally conductive protective material 20, an additive (hereinafter referred to as "inhibiting additive") that prevents the filler from being present is added to the evanescent region. Examples of this inhibiting additive include a fine particle such as AEROSIL (registered trademark). The amounts of filler and inhibiting additive to be added to the thermally conductive protective material 20 are determined experimentally in advance.

With the optical processing structure according to the present embodiment configured as described above, a filler with a refractive index higher than that of the cladding 12 is present in the evanescent region in the thermally conductive protective material 20, thereby enabling proper removal of cladding mode light.

With the optical processing structure according to the present embodiment, the inhibiting additive is present in the evanescent region in the thermally conductive protective material 20, thereby enabling control of the amount of filler in the evanescent region to an appropriate amount. In other words, the degree of proximity between the filler and the optical fiber 10 can be adjusted by allowing the inhibiting additive to enter between the filler and the optical fiber 10. This configuration makes it possible to uniformly disperse and remove cladding mode light in the longitudinal direction of the cladding 12, thereby enabling suppression of localized heat generation of the optical fiber 10.

With the optical processing structure according to the present embodiment, the inhibiting additive is present in the evanescent region in the thermally conductive protective material 20, so that the cladding mode light can be properly removed with the thermal conductivity of the thermally conductive protective material 20 being maintained.

In addition, in the optical processing structure according to the present embodiment, a filler with a large diameter (e.g., 30 to 50 µm on average) and a filler with a small diameter (e.g., approximately 10 µm on average) are combined to form the closest packing, so that both removal of cladding mode light and improvement of heat dissipation, durability, and other properties can be achieved.

EXAMPLE

Figure 10:
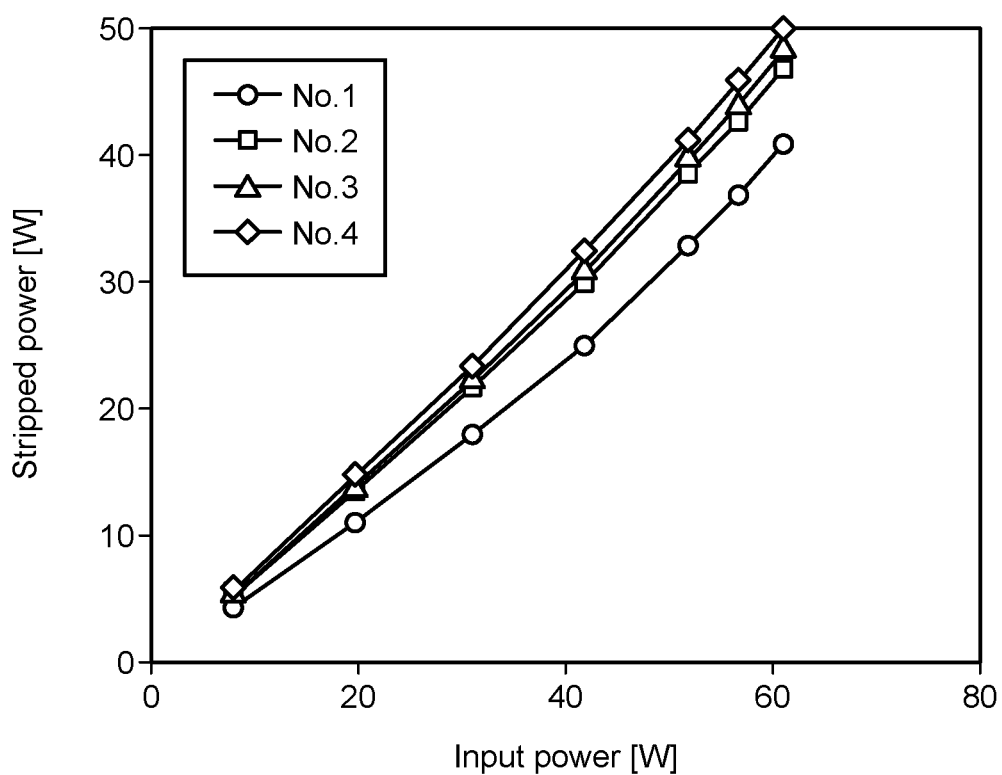
FIG. 10 is a graph representing the relationship between an amount of filler contained in the thermally conductive protective material and the cladding mode light removed from the optical fiber.

The present disclosure will be explained in more detail with the following example. FIG. 10 is a graph representing the relationship between an amount (concentration) of filler contained in the thermally conductive protective material and the cladding mode light removed from the optical fiber.

In FIG. 10, No. 1 is an optical fiber with a thermally conductive protective material containing 20 vol % boron nitride (BN) as a filler, No. 2 is an optical fiber with a thermally conductive protective material containing 25 vol % boron nitride, No. 3 is an optical fiber with a thermally conductive protective material containing 30 vol % boron nitride, and No. 4 is an optical fiber with a thermally conductive protective material containing 40 vol % boron nitride. Table 1 below also represents the removal gradient of cladding mode light removed from the optical fibers represented in FIG. 10.

TABLE 1

| | Amount of BN [vol %] | Removal gradient |
|---|---|---|
| No. 1 | 20 | 0.69 |
| No. 2 | 25 | 0.78 |
| No. 3 | 30 | 0.81 |
| No. 4 | 40 | 0.83 |

As represented in FIG. 10 and Table 1, the larger the amount of filler contained in a thermally conductive protective material, the easier it is for cladding mode light to escape through the thermally conductive protective material. In other words, cladding mode light escapes more easily in the following order: No. 4 (boron nitride: 40 vol %), No. 3 (boron nitride: 30 vol %), No. 2 (boron nitride: 25 vol %), and No. 1 (boron nitride: 20 vol %).

The optical processing structure of an optical fiber according to the embodiment of the present disclosure has been described in detail in Description of Embodiment and Example, but the gist of the present disclosure is not limited to these descriptions and must be broadly interpreted based on the claims. In addition, it goes without saying that various changes and modifications based on these descriptions are also included in the purpose of the present disclosure.

Figure 11:
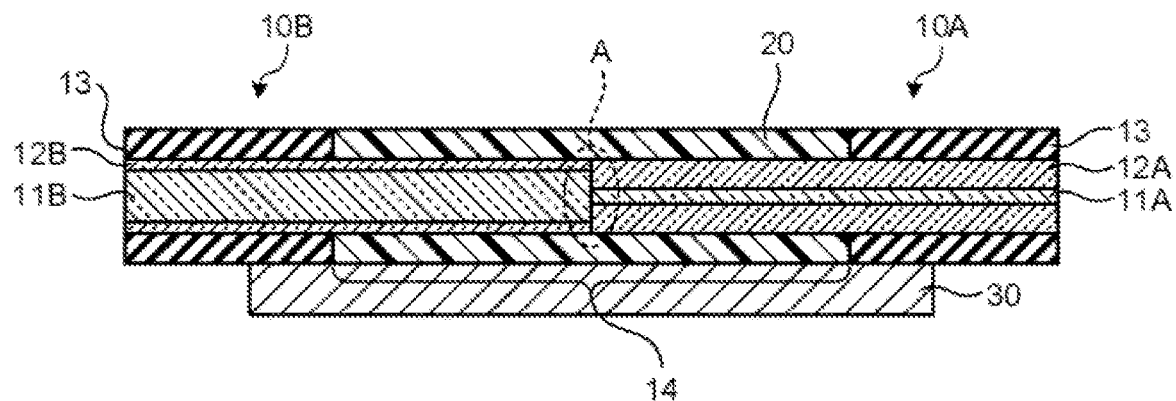
FIG. 11 is a sectional view illustrating a configuration of a modification of the optical processing structure of an optical fiber according to the embodiment of the present disclosure.

For example, in the optical processing structure described above, an example with a single optical fiber 10 is described, but another structure may be acceptable that includes multiple optical fibers with different core diameters. For example, the optical processing structure illustrated in FIG. 11 includes an optical fiber 10A from which the coating 13 has been partially removed, an optical fiber 10B from which the coating 13 has been partially removed, the thermally conductive protective material 20, and the thermally conductive base material 30.

Figure 11A:
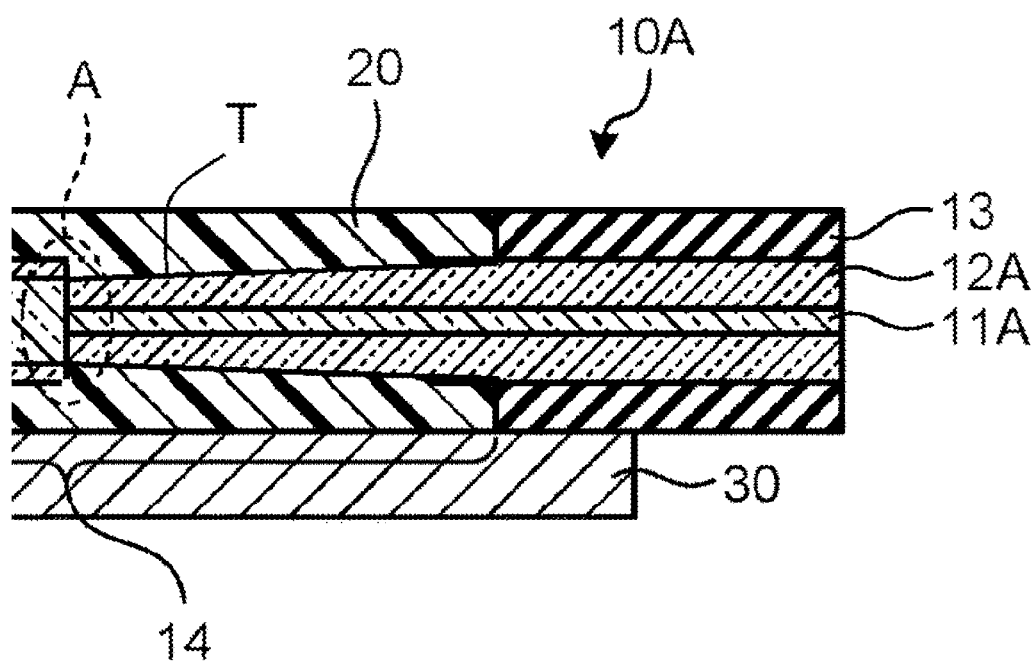
FIG. 11A is a schematic illustration of an optical fiber having a cladding formed in a tapered shape.

The optical fiber 10A includes a small-diameter core 11A located at the center of the optical fiber 10A, a cladding 12A covering the outer circumference of the core 11A, and a coating 13 covering the outer circumference of the cladding 12A. The optical fiber 10B includes a large-diameter core 11B located at the center of the optical fiber 10B, a cladding 12B covering the outer circumference of the core 11B, and a coating 13 covering the outer circumference of the cladding 12B. The optical fibers 10A and 10B are fused together at part A in FIG. 11. The outer circumferences of the claddings 12A, 12B in the coating removed region 14 may be formed in a tapered shape T as schematically illustrated in FIG. 11A. By forming the outer circumferences of the claddings 12A, 12B in the coating removed region 14 in a tapered shape, the cladding mode light escapes more easily out of the claddings 12A, 12B.

In such an optical processing structure, the cladding mode light can be properly removed by controlling the amount of filler contained in the evanescent region in the thermally conductive protective material 20.

Alternatively, by adding an inhibiting additive to the evanescent region, the cladding mode light can be uniformly dispersed and removed in the longitudinal direction of the claddings 12A, 12B, thereby enabling suppression of localized heat generation of the optical fibers 10A, 10B.

INDUSTRIAL APPLICABILITY

The present disclosure can be used for an optical processing structure of an optical fiber.

According to the present disclosure, a filler with a refractive index higher than that of a cladding is present in a region where evanescent light is present, so that cladding mode light can be properly removed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical processing structure of an optical fiber, comprising:
    an optical fiber that includes a core, a cladding, and a coating, the coating being partially removed; and
    a thermally conductive protective material made of a silicone-based thermally conductive compound and provided around the cladding in a coating removed region of the optical fiber, wherein
    the thermally conductive protective material contains a filler having a refractive index higher than a refractive index of the cladding,
    the filler is present in a region where evanescent light seeping out of the cladding is present when cladding mode light propagating in the cladding is totally reflected, and
    the thermally conductive protective material further contains dry silica as an additive that prevents the filler from being present, in the region where evanescent light is present.

2. An optical processing structure of an optical fiber, comprising:
    an optical fiber that includes a core, a cladding, and a coating, the coating being partially removed; and
    a thermally conductive protective material made of a silicone-based thermally conductive compound and provided around the cladding in a coating removed region of the optical fiber, wherein
    the thermally conductive protective material contains a filler having a refractive index higher than a refractive index of the cladding,
    the filler is present in a region where evanescent light seeping out of the cladding is present when cladding mode light propagating in the cladding is totally reflected, and
    the filler contains either boron nitride or aluminum nitride, and the filler includes a filler whose diameter is 30 to 50 μm on average and a filler whose diameter is approximately 10 μm on average.

3. An optical processing structure of an optical fiber, comprising:
   an optical fiber that includes a core, a cladding, and a coating, the coating being partially removed; and
   a thermally conductive protective material made of a silicone-based thermally conductive compound and provided around the cladding in a coating removed region of the optical fiber, wherein
   the thermally conductive protective material is made of a substance having a refractive index higher than a refractive index of the cladding at room temperature and becomes lower as a temperature rises,
   the refractive index of the thermally conductive protective material is lower than the refractive index of the cladding in a given temperature range, and
   the thermally conductive protective material further contains dry silica as an additive that prevents the filler from being present, in the region where evanescent light is present.

4. An optical processing structure of an optical fiber, comprising:
   an optical fiber that includes a core, a cladding, and a coating, the coating being partially removed; and
   a thermally conductive protective material made of a silicone-based thermally conductive compound and provided around the cladding in a coating removed region of the optical fiber, wherein
   the thermally conductive protective material is made of a substance having a refractive index higher than a refractive index of the cladding at room temperature and becomes lower as a temperature rises,
   the refractive index of the thermally conductive protective material is lower than the refractive index of the cladding in a given temperature range,
   the filler contains either boron nitride or aluminum nitride, and
   the filler includes a filler whose diameter is 30 to 50 μm on average and a filler whose diameter is approximately 10 μm on average.

5. An optical processing structure of an optical fiber, comprising:
   an optical fiber that includes a core, a cladding, and a coating, the coating being partially removed; and
   a thermally conductive protective material made of a silicone-based thermally conductive compound and provided around the cladding in a coating removed region of the optical fiber, wherein
   the thermally conductive protective material contains a filler having a refractive index higher than a refractive index of the cladding, and
   the filler is configured to cause cladding mode light propagating in the cladding by being totally reflected to seep out of the cladding as evanescent light in the coating removed region, wherein the coating removed region does not correspond to a splice in the optical fiber.

6. An optical processing structure of an optical fiber, comprising:
   an optical fiber that includes a core, a cladding, and a coating, the coating being partially removed; and
   a thermally conductive protective material made of a silicone-based thermally conductive compound and provided around the cladding in a coating removed region of the optical fiber, wherein
   the thermally conductive protective material is made of a substance having a refractive index higher than a refractive index of the cladding at room temperature and becomes lower as a temperature rises
   the refractive index of the thermally conductive protective material is lower than the refractive index of the cladding in a given temperature range, and
   the thermally conductive protective material is configured to cause cladding mode light propagation in the cladding of the optical fiber by being totally reflected to seep out of the cladding as evanescent light in the coating removed region, wherein the coating removed region does not correspond to a splice in the optical fiber.

7. An optical processing structure of an optical fiber, comprising:
   an optical fiber that includes a core, a cladding, and a coating, the coating being partially removed; and
   a thermally conductive protective material made of a silicone-based thermally conductive compound and provided around the cladding in a coating removed region of the optical fiber, wherein
   the thermally conductive protective material contains a filler having a refractive index higher than a refractive index of the cladding
   the thermally conductive protective material is a combination of a thermally conductive protective material having a refractive index higher than the refractive index of the cladding at room temperature and a thermally conductive protective material having a refractive index lower than the refractive index of the cladding, and
   the thermally conductive protective material is configured to cause cladding mode light propagation in the cladding of the optical fiber by being totally reflected to seep out of the cladding as evanescent light in the coating removed region, wherein the coating removed region does not correspond to a splice in the optical fiber.

8. An optical processing structure of an optical fiber, comprising:
   an optical fiber that includes a core, a cladding, and a coating, the coating being partially removed; and
   a thermally conductive protective material made of a silicone-based thermally conductive compound and provided around the cladding in a coating removed region of the optical fiber, wherein
   the thermally conductive protective material contains a filler having a refractive index higher than a refractive index of the cladding, and
   the filler is configured to cause cladding mode light propagating in the cladding by being totally reflected to seep out of the cladding as evanescent light in the coating removed region, and
   the outer circumference of the claddings in the coating removed region are formed in a tapered shape, wherein the coating removed region does not correspond to a splice in the optical fiber.

* * * * *